United States Patent
Page et al.

(10) Patent No.: US 10,443,212 B2
(45) Date of Patent: Oct. 15, 2019

(54) COUNTERWEIGHT ASSEMBLY

(71) Applicant: J. C. Bamford Excavators Limited, Uttoxeter, Staffordshire (GB)

(72) Inventors: Ryan Page, Uttoxeter (GB); Ian Carswell, Uttoxeter (GB)

(73) Assignee: J. C. Bamford Excavators Limited, Uttoxeter, Staffordshire (GB)

( * ) Notice: Subject to any disclaimer, the term of this patent is extended or adjusted under 35 U.S.C. 154(b) by 212 days.

(21) Appl. No.: 14/927,303

(22) Filed: Oct. 29, 2015

(65) Prior Publication Data

US 2016/0122976 A1    May 5, 2016

(30) Foreign Application Priority Data

Oct. 29, 2014  (GB) .................................. 1419278.5

(51) Int. Cl.
| | |
|---|---|
| *E02F 9/18* | (2006.01) |
| *B62D 49/08* | (2006.01) |
| *E02F 9/08* | (2006.01) |
| *E02D 17/13* | (2006.01) |

(52) U.S. Cl.
CPC .............. *E02F 9/18* (2013.01); *B62D 49/085* (2013.01); *E02F 9/0858* (2013.01); *E02F 9/0866* (2013.01); *E02D 17/13* (2013.01)

(58) Field of Classification Search
CPC .... B62D 49/085; E02F 9/0858; E02F 9/0866; E02F 9/18
USPC .......................................... 280/755; 414/719
See application file for complete search history.

(56) References Cited

U.S. PATENT DOCUMENTS

| | | | | |
|---|---|---|---|---|
| 3,868,992 A | * | 3/1975 | Getz ...................... | B60K 11/04 165/122 |
| 6,481,748 B1 | | 11/2002 | Okuda et al. | |
| 6,745,860 B2 | * | 6/2004 | Yabe ..................... | E02F 9/0866 180/68.1 |
| 2001/0007292 A1 | * | 7/2001 | Yabf ..................... | E02F 9/0866 180/68.1 |
| 2011/0000637 A1 | * | 1/2011 | Chang ................... | B60K 11/04 165/41 |

FOREIGN PATENT DOCUMENTS

| | | |
|---|---|---|
| DE | 3722215 C1 | 9/1988 |
| EP | 1 260 637 A1 | 11/2002 |
| EP | 1 462 579 A1 | 9/2004 |
| EP | 2 088 249 A1 | 8/2009 |
| EP | 2 243 651 A1 | 10/2010 |

(Continued)

OTHER PUBLICATIONS

Machine Translation of DE3722215 C1.*

(Continued)

*Primary Examiner* — Saul Rodriguez
*Assistant Examiner* — Brendan P Tighe
(74) *Attorney, Agent, or Firm* — Marshall, Gerstein & Borun LLP (57) ABSTRACT

A counterweight assembly for a working machine comprising a counterweight having a mass for counterbalancing a working arm of the working machine, the counterweight comprising a mounting arrangement for the mounting of a heat exchanger thereon and defining an air flow path having an inlet and an outlet to permit air to flow through the heat exchanger when mounted thereon.

17 Claims, 5 Drawing Sheets

(56) References Cited

FOREIGN PATENT DOCUMENTS

| | | |
|---|---|---|
| EP | 2 863 027 A1 | 4/2015 |
| JP | H4-076930 U | 7/1992 |
| JP | 2000-080676 A | 3/2000 |
| JP | 2000-080679 A | 3/2000 |
| JP | 2003-41627 | 2/2003 |
| JP | 2004-353532 A | 12/2004 |
| JP | 2005-036447 A | 2/2005 |
| JP | 2010-52894 | 3/2010 |
| JP | 2013-241809 A | 12/2013 |
| JP | 2014-125868 A | 7/2014 |
| JP | 2014134055 A * | 7/2014 |

OTHER PUBLICATIONS

Search Report for GB 1419278.5, dated Feb. 10, 2015.
Extended European Search Report for EP 15 19 2201, dated Mar. 2, 2016.
Office Action dated in Japanese Patent Application No. 2015-211645, dated Jul. 25, 2019.

* cited by examiner

COUNTERWEIGHT ASSEMBLY

FIELD OF THE INVENTION

The present invention relates to a counterweight assembly for a working machine and to a method of manufacturing a counterweight assembly for a working machine.

BACKGROUND OF THE INVENTION

Various types of working machines are known. Such machines are used typically for soil-shifting operations (e.g. trenching, grading, and loading) and materials handling (e.g. depositing aggregate in trenches, lifting materials and placing them on an elevated platform).

Such machines are typically manufactured from a set of subassemblies designed specifically for one type of machine, although certain components such as engines, gearboxes, hydraulic pumps and counterweights may be shared across different machine types.

The working machines typically include a working arm arrangement for manipulating an attachment, such as a bucket, and a counterweight to balance the working machine when the working arm is in use.

Working machines typically include an operator cab unit and an air conditioning unit for the cab unit. Typically, the air conditioning unit is mounted onto the roof or the back of the operator cab unit which is problematic as it may increase the overall height of the working machine, impact on the visibility of the operator or overhang the rotational envelope of a machine, where it may become susceptible to damage.

The present invention seeks to overcome or at least mitigate the problems of the prior art.

SUMMARY OF THE INVENTION

A first aspect of the invention provides a counterweight assembly for a working machine comprising a counterweight having a mass for counterbalancing a working arm of the working machine, the counterweight comprising a mounting arrangement for the mounting of a heat exchanger thereon and defining an air flow path having an inlet and an outlet to permit air to flow through the heat exchanger when mounted thereon.

Advantageously, this provides a compact packaging of the heat exchanger. This arrangement may decrease the overall height of the working machine. Further, this arrangement minimizes the impact on visibility and may minimize the amount of machine overhang. It may additional protect the heat exchanger from impact damage.

In one embodiment, a heat exchanger is mounted to the mounting arrangement.

In one embodiment, the mounting arrangement is configured such that the heat exchanger is enclosed on four sides.

Advantageously, this further provides protection of the heat exchanger unit from damage. Further, this may enhance air flow through the heat exchanger by virtue of convection effects.

In one embodiment, the counterweight is configured to define an air flow path in the form of a duct therethrough.

In one embodiment, a fan is mounted in conjunction with the heat exchanger.

In one embodiment, the counterweight comprises a top surface, a bottom surface and at least one side surface.

In one embodiment, the mounting arrangement is located proximate the bottom surface.

In one embodiment, the counterweight assembly further comprises a grill, wherein the grille is mounted proximate the top surface.

Advantageously, this may prevent and debris from falling into the duct.

In one embodiment, the mounting arrangement is located proximate the top surface of the counterweight assembly.

In one embodiment, the mounting arrangement is located proximate a side surface of the counterweight assembly.

In one embodiment, the mounting arrangement comprises a plurality of threaded bores.

In one embodiment, the duct is configured to define at least one mounting surface which includes the plurality of threaded bores.

In one embodiment, when the heat exchanger is mounted to the mounting assembly the heat exchanger abuts against the or each mounting surface.

In one embodiment, the counterweight is formed as a single unitary component, for example a cast iron or steel component.

In one embodiment, the heat exchanger is a condenser of an air conditioning system.

In one embodiment, the fan is configured to drive air through the inlet, through the condenser to the outlet.

A second aspect of the invention provides a working machine comprising a working arm configured so as to be capable of performing working operations, and a counterweight assembly according to the first aspect.

Advantageously, this provides a compact packaging of the heat exchanger. This arrangement may decrease the overall height of the working machine. Further, this arrangement minimizes the impact on visibility and may minimize the amount of machine overhang. It may additional protect the heat exchanger from impact damage.

In one embodiment, the working machine further comprises an operator cab and wherein the heat exchanger is a condenser of an air conditioning unit for the operator cab.

A further aspect of the invention provides a method of manufacturing a counterweight with a heat exchanger mounted therein, comprising the steps of: producing a counterweight comprising an air flow path and a mounting arrangement; and mounting a heat exchanger to mounting arrangement.

In one embodiment, the heat exchanger is a condenser of an air conditioning unit.

In one embodiment, the air flow path defines a duct.

In one embodiment, the method further comprises the step of securing a fan to the condenser.

In one embodiment, the method further comprises the step of securing a grille to the fan.

BRIEF DESCRIPTION OF THE DRAWINGS

Embodiments of the invention will now be described with reference to the accompanying drawings, in which.

DETAILED DESCRIPTION

Figure 1:
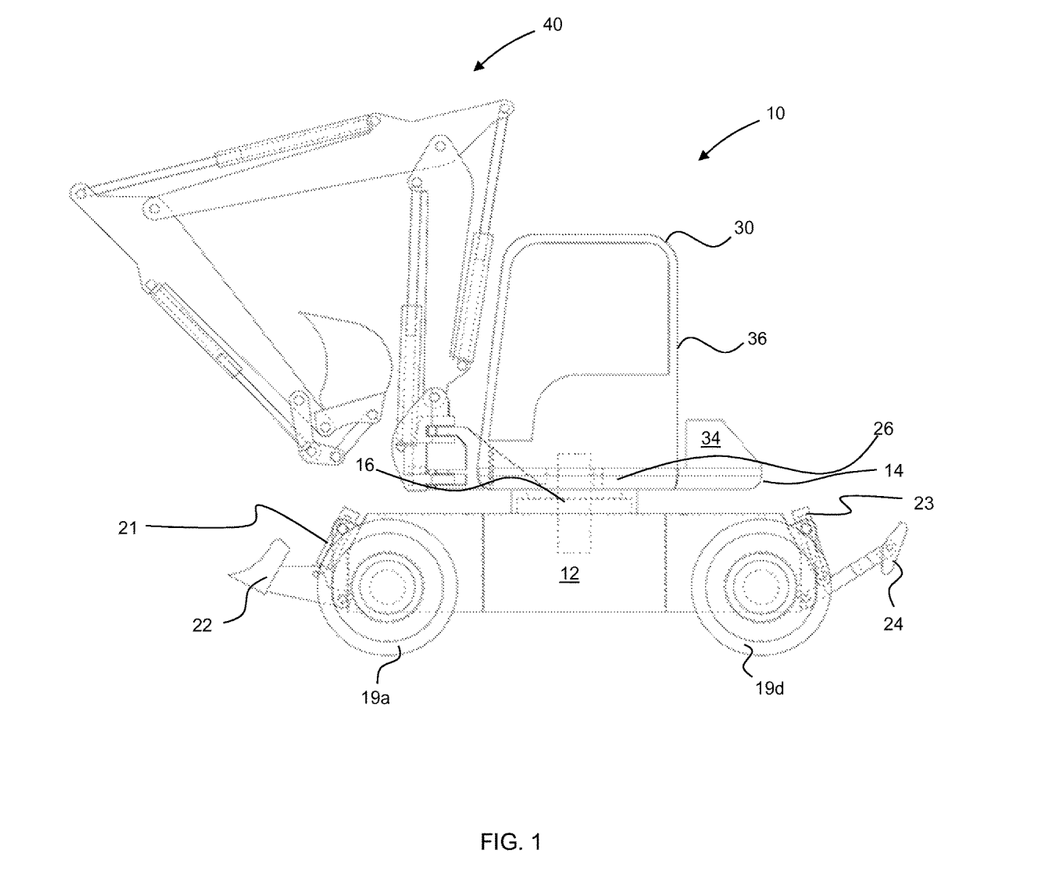
FIG. 1 is a side view of a working machine according to an embodiment of the present invention in a straight dig position.

With reference to FIG. 1, there is illustrated in somewhat simplified form a working machine 10 according to an embodiment of the present invention, in this case a wheeled slew excavator. The machine comprises an undercarriage 12 and a superstructure 14 linked by a slewing mechanism in the form of a slew ring 16. The slew ring 16 permits unrestricted rotation of the superstructure 14 relative to the undercarriage 12 in this embodiment. A working arm arrangement 40 is rotatably mounted to the superstructure 14 and provided for performing material handling operations.

The undercarriage is connected to a ground engaging structure, comprising four wheels 19a, 19b, 19c, 19d. The wheels 19a, 19b, 19c, 19d, are typically provided with off-road pneumatic tires.

A dozer blade arrangement 22 is pivotally secured to one end of the undercarriage 12, which may be raised and lowered by hydraulic cylinders 21 using a known arrangement, and also act as a stabilizer for the machine, by lifting the adjacent wheels 19a, 19b off the ground when excavating.

A stabilizer leg arrangement 24 is pivotally mounted to an opposite end of the undercarriage 12 to the dozer blade assembly 22, which also may be raised and lowered by hydraulic cylinders 23 using a known arrangement.

The superstructure 14 comprises a structural platform 26 mounted on the slew ring 16. As can be seen in the Figure, the slew ring 16 is substantially central to the undercarriage 12 so as to mount the superstructure 14 central to the undercarriage. The slew ring 16 permits rotation of the superstructure 14 relative to the undercarriage 12.

The platform 26 mounts a cab 30. The cab 30 houses the operator's seat and machine controls. The cab 30 is mounted forwards and to the left of the superstructure 14 in this embodiment and is fixed for rotation together with the superstructure. In plan view the cab 30 is substantially rectangular and has a substantially vertical rear wall 36 and right hand side wall (not visible).

The superstructure 14 further comprises a counterweight 34 to counterbalance the working arm arrangement 40 and positioned at an aft end of the superstructure opposite to the working arm 40 to optimize the counterbalance effect.

In this embodiment a prime mover, main hydraulic pump, and transmission (not shown) for the working machine 10 are located in the undercarriage 12, but in other embodiments the engine and main hydraulic pump are located in the superstructure 14.

Figure 2:
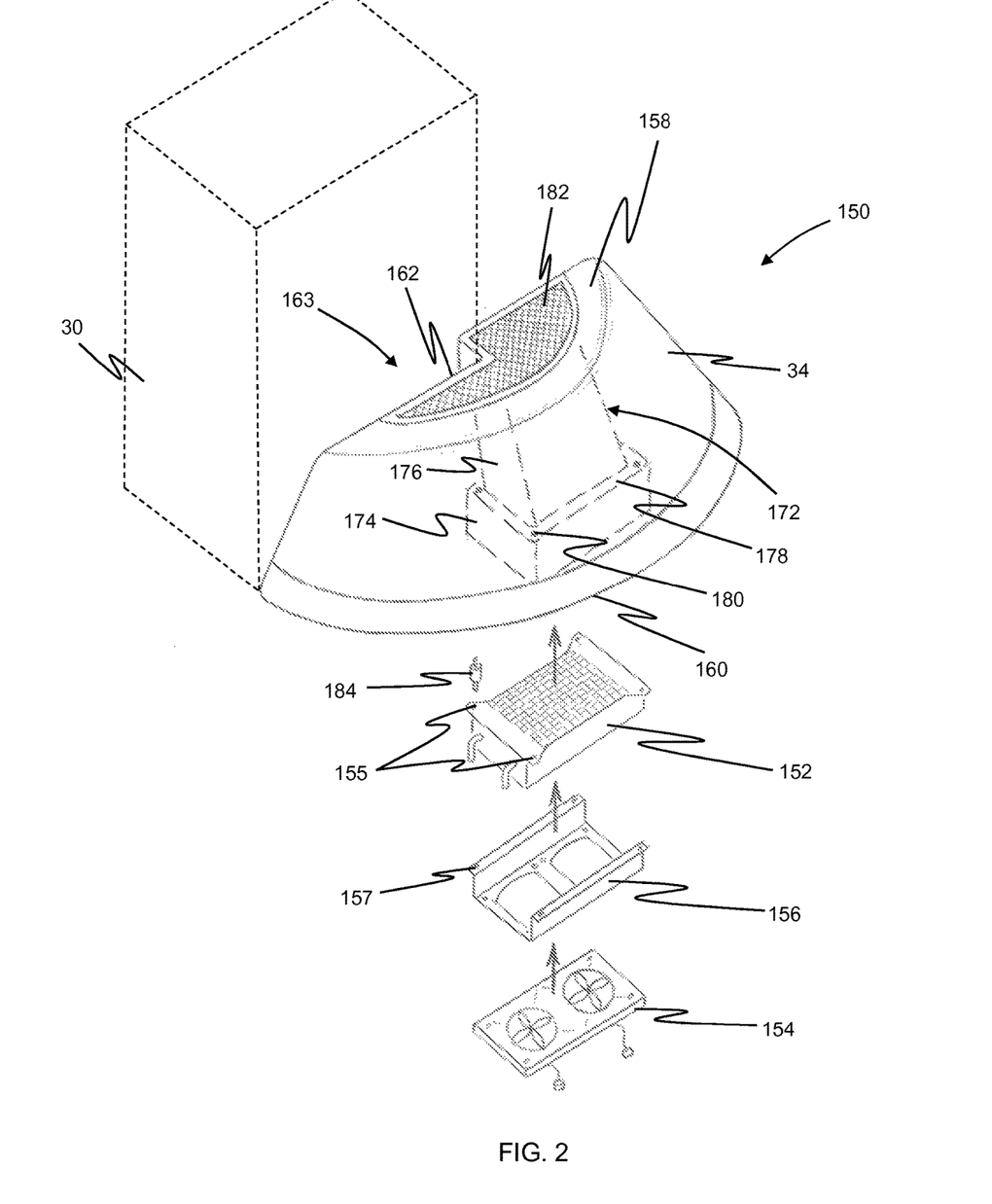
FIG. 2 is an isometric view of a counterweight assembly according to an embodiment of the present invention.

Referring to FIG. 2, the counterweight assembly 150 incorporating the counterweight 34 is illustrated in more detail. The counterweight 34 has an upper surface 158 and a lower surface 160 which are substantially parallel to each other, a vertical front surface 162 configured to be positioned against the rear wall 36 of the cab 30, and an angled surface 164 at the point furthest from the cab. Consequently, the counterweight 34 is substantially a right angled trapezium in side view. The counterweight 34 defines a segment of a circle in plan view by virtue of the angled surface 164 also being curved.

This curved shape serves to minimize the overhang of the superstructure 14 relative to the undercarriage 12 across the full range of rotation of the superstructure such that the working machine may be considered to be a compact tail swing (CTS) or a zero tail swing (ZTS) excavator.

In this embodiment, the front surface 162 of the counterweight 34 is configured with a recess 163 for a compact fit against the rear of the cab 30 and the recess extends substantially half of the width of the counterweight 34 and the recess of the counterweight is shown positioned against a cab in the Figure. The counterweight 34 protrudes upwardly from the platform 26 by a distance that is ¼ to ⅓ of the height of the cab 30. Such a height has been found to have limited impedance on an operator's line of sight across a range of operating modes. That is, an operator's line of sight is improved when looking over their shoulder.

In this embodiment, the counterweight 34 is cast a single component and is produced to define an air flow path 172 therethrough and a mounting arrangement 178 by using a suitable core as part of the casting process. The counterweight assembly 150 comprises a counterweight 34, a condenser 152 of an air conditioning unit, a twin electric fan 154 and a fan mounting frame 156. In alternative embodiments the fan 154 may be hydraulically powered.

In this embodiment, the air flow path defines a duct 172 formed through the counterweight 34 defining an inlet and an outlet. The duct 172 defines two regions through the counterweight 34, the first 174 is substantially rectangular in shape at the inlet to conform to the shape of the condenser 152, and the second 176 is narrower than the first so as to provide the mounting surface 178. In this embodiment, the mounting surface is provided in the form of a ledge 178 at the interface between the regions which extends around all four internal side of the duct. The first region 174 extends substantially perpendicular to the lower surface 160 and extends a distance which is substantially equal to the height of the condenser 152, fan 154 and mount 156 system.

In this embodiment, the ledge 178 comprises four threaded bores 180 located in the four corners of the ledge for mounting the condenser 152 thereon. The condenser 152 further comprises four bores 155 located in the four corners defined by the rectangular shape of the condenser. The mounting frame 156 further comprises four bores 157 which are configured to align with the bores 155 of the condenser 152 when the condenser and frame are assembled.

Assembly of the counterweight assembly may be as follows: the electric fan 154 is secured to the mounting frame 156 and the fan and frame arrangement is then the condenser 152 is inserted into the frame so as to align the bores 157 of the mounting frame 156 with the bores 155 of the condenser 154. The mounting frame 156 and condenser 152 are then secured to the threaded bores 180 of the ledge 178 via four elastomer mounts 184.

A grille 182 is secured to the upper surface 158 of the counterweight 150 to prevent debris from falling into the duct 172 but configured to enable a sufficient air flow therethrough. In this embodiment, the electric fan 154 configured so as to drive air to flow through the inlet located proximate the lower surface 160 and flow through the condenser 152 and duct 172 and through the outlet located on the upper surface 158 of the counterweight 34.

Referring to FIGS. 3, 4, 5, and 6, simplified schematic diagrams of alternative embodiments of the counterweight assembly are shown.

Figure 3:
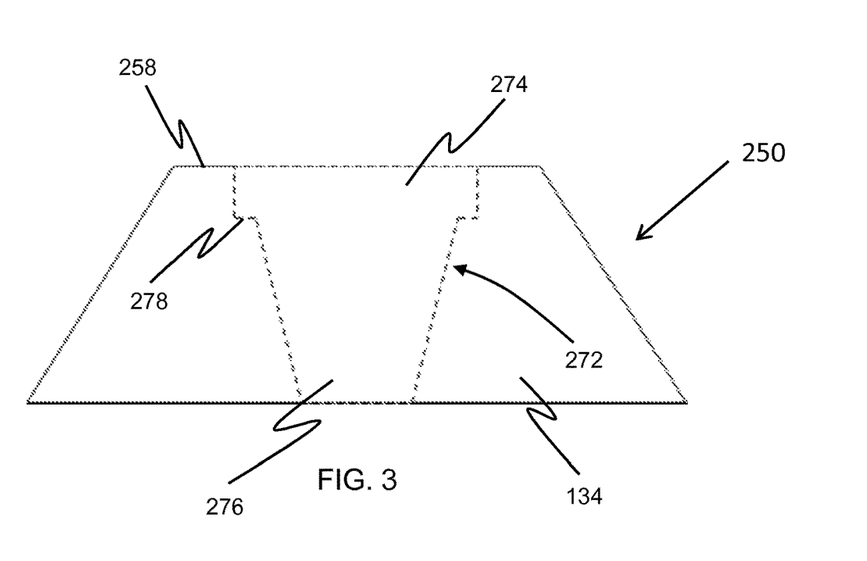
FIG. 3 is a schematic rear view of a counterweight assembly according to an alternative embodiment of the present invention.

FIG. 3 illustrates a counterweight where the condenser, fan and fan mount (not shown) are to be mounted into the upper surface 258 of the counterweight, corresponding components of this figure are labeled 100 higher with respect to FIGS. 1 and 2. Only differences are discussed in more detail. A duct 272 is formed through the counterweight 134, having two regions. The first 274 is substantially rectangular in shape, and the second 276 is narrower so as to define a ledge 278 at the interface between the regions. A grille (not shown) may also be mounted over the counterweight for protection.

Figure 4:
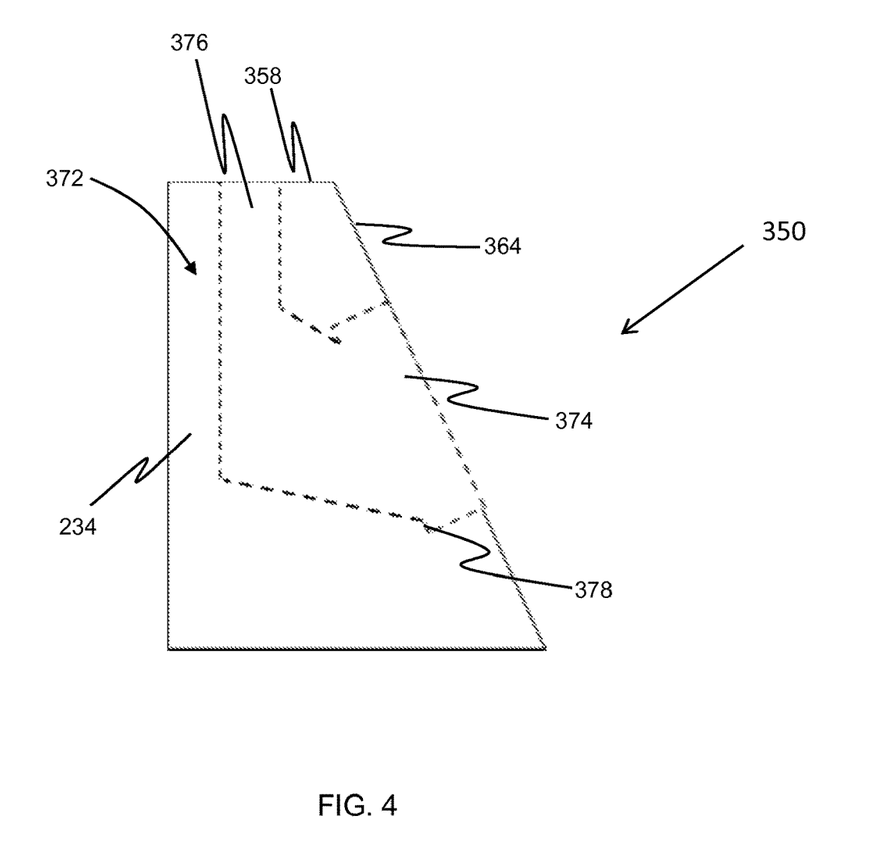
FIG. 4 is a schematic side view of a counterweight assembly according to an alternative embodiment of the present invention.

FIG. 4 illustrates a counterweight where the condenser, fan and fan mount are to be mounted into the angled and curved surface of the counterweight, corresponding components of this figure are labeled 100 higher with respect to FIG. 3. Only differences are discussed in more detail. A duct 372 is formed through the counterweight 234, having two regions. The first region 374 is substantially rectangular in shape, and the second region 376 is narrower so as to define a ledge 378 at the interface between the regions. The first region 374 extends substantially perpendicular to the curved surface 364. The duct 372 extends into the angled surface 364 counterweight 234 and is configured to extending a general L-shape through the counterweight and provide an outlet on the upper surface 358 of the counterweight.

Figure 5:
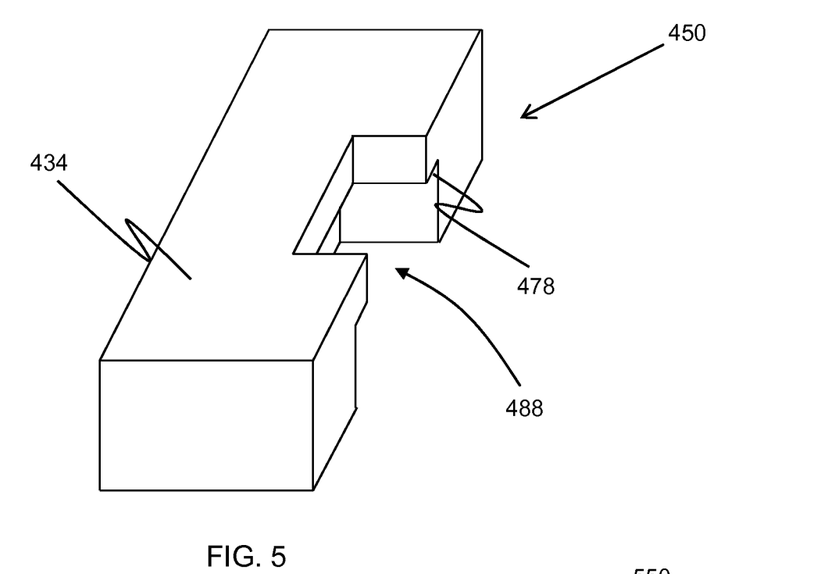
FIG. 5 is a schematic isometric view of a counterweight assembly according to an alternative embodiment of the present invention.

FIG. 5 illustrates a counterweight according to an alternative embodiment of the present invention, corresponding components of this figure are labeled 100 higher with respect to FIG. 4. The counterweight 334 is generally a U-shape in plan view so as to define a channel 488 on one side of the counterweight, rather than an enclosed duct of the previous embodiments. In this embodiment, the condenser (not shown) will be surrounded by three sides of the counterweight 334. In this embodiment the mounting arrangement 478 is provided in the form of a ledge extending around the three internal faces channel 488. The condenser is then able to be mounted to the underside of the ledge 478. The top and/or open side of the channel 488 may be covered by a grille (not shown). A protective plate (not shown) may be secured to the counterweight to protect the condenser etc. from impact damage.

Figure 6:
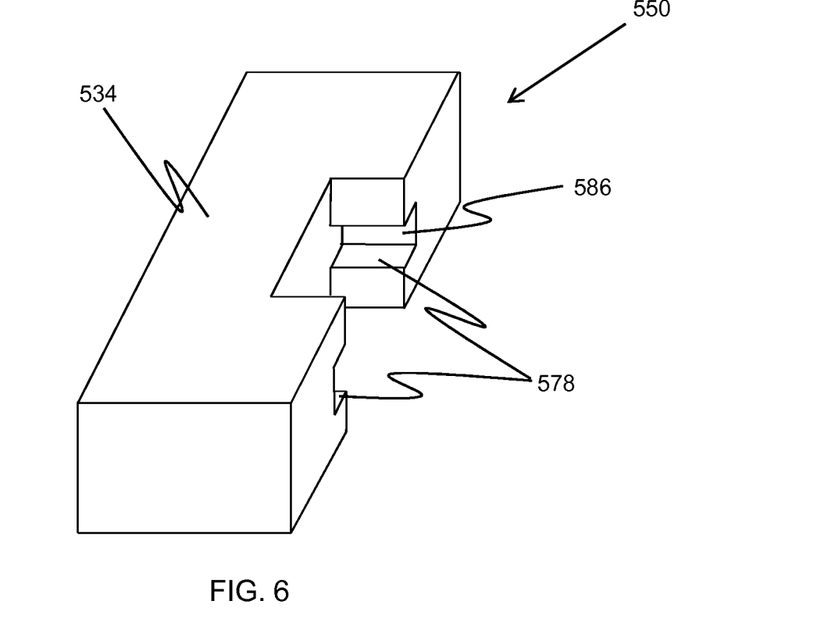
FIG. 6 is a schematic isometric view of a counterweight assembly according to an alternative embodiment of the present invention.

FIG. 6 illustrates a counterweight assembly according to an alternative embodiment of the present invention, corresponding components of this figure are labeled 100 higher with respect to FIG. 5. The arrangement is similar to FIG. 5 except that the mounting arrangement 578 is provided by recesses 586 in two opposing sides of the channel 588. In this embodiment, the condenser (not shown) are inserted into the counterweight 434 substantially horizontally and may be suitably retained with fasteners (not shown).

Figure 7:
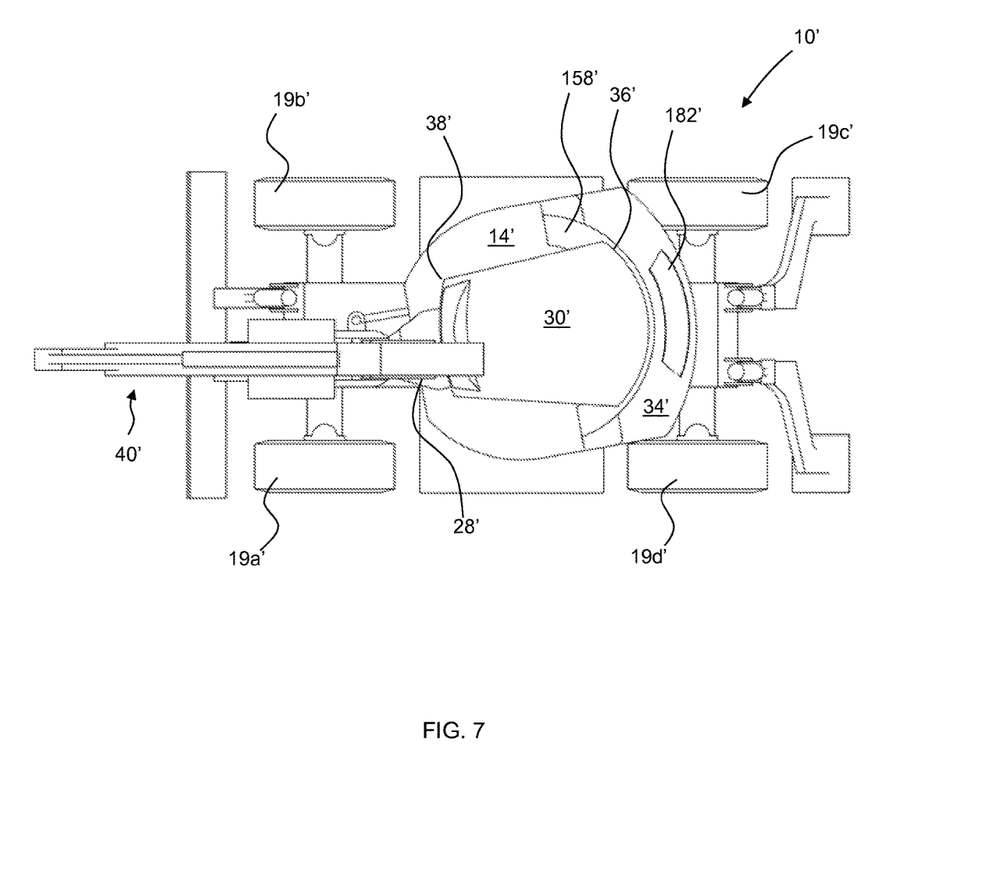
FIG. 7 is a plan view of a working machine according to an alternative embodiment of the present invention.

In an alternative embodiment, in which like parts are labeled by like numerals with the addition of the suffix ', as illustrated in FIG. 7, the cab 30' is rotatably mounted to the superstructure 14'. In this embodiment, the counterweight 34' has a curved profile in a region nearest the cab. The front 38' and rear 36' of the cab 30' each have a curved profile that is complimentary to the curved profile of the counterweight 34' to allow for rotation of the cab. The complimentary curved profiles accommodate rotation of the cab 30' relative to the superstructure 14' in a particularly compact manner. The rotation of the cab 30' relative to the superstructure 14' allows the working machine 10' to switch between a straight dig position where the counterweight 34' is behind the cab and a roading position where the counterweight assembly is in front of the cab. As shown in the Figure, the rear of the cab 30' extends over the upper surface 158' of the counterweight 34', and so in this embodiment the outlet of the duct 172' is located in the curved surface 164' of the counterweight. A grille 182' may further be mounted to the curved surface 164' of the counterweight to cover the outlet of the duct 172'.

Although the invention has been described above with reference to one or more preferred embodiments, it will be appreciated that various changes or modifications may be made without departing from the scope of the invention as defined in the appended claims.

In other embodiments the counterweight may be formed via a plurality of complimentary sections which, when stacked and secured together, form a counterweight defining an air flow path therethrough and a mounting arrangement.

In the present invention the working machine may be considered to be a midi excavator. In other embodiments, the counterweight assembly may be fitted to other working machines for example a telehandler, a loader or a crane.

In other embodiments, a different form a heat exchanger, such as a radiator for cooling the engine, transmission, steering or hydraulic system for example, may be secured to the counterweight. Further, more than one heat exchanger may be mounted to the counterweight.

In other embodiments, the mounting arrangement may be in a different form, such as providing a ledge on two opposing sides of the duct with two threaded bores located in each ledge, or providing a protruding surface in each of the four corners of the duct with each ledge comprising a threaded bore therein.

The invention claimed is:

1. A working machine comprising:
    a housing;
    an engine disposed in the housing;
    a working arm configured to be capable of performing working operations; and
    a counterweight having a mass for counterbalancing the working arm, the counterweight being separate from the housing and comprising a mounting arrangement for the mounting of a heat exchanger thereon,
    the counterweight comprising an inlet on a first external surface of the counterweight and an outlet on a second external surface of the counterweight that define an air flow path in the form of a duct through the counterweight to permit air to flow through the heat exchanger when mounted thereon, wherein the mounting arrangement is configured such that the heat exchanger is enclosed on four sides.

2. A working machine according to claim 1, wherein a fan is mounted in conjunction with the heat exchanger.

3. A working machine according to claim 1, wherein the counterweight comprises a top surface, a bottom surface and at least one side surface.

4. A working machine according to claim 3, wherein the mounting arrangement is located proximate the bottom surface.

5. A working machine according to claim 3, further comprising a grille, wherein the grille is mounted proximate the top surface.

6. A working machine according to claim 3, wherein the mounting arrangement is located proximate the top surface of the counterweight assembly.

7. A working machine according to claim 3, wherein the mounting arrangement is located proximate a side surface of the counterweight assembly.

8. A working machine according to claim 1, wherein the mounting arrangement comprises a plurality of threaded bores.

9. A working machine according to claim 8, wherein the mounting arrangement comprises a plurality of threaded bores, and wherein the duct is configured to define at least one mounting surface which includes the plurality of threaded bores.

10. A working machine according to claim 1, wherein the counterweight is formed as a single unitary component.

11. A working machine according to claim 1, wherein the heat exchanger is a condenser of an air conditioning system.

12. A working machine according to claim 1, further comprising an operator cab and wherein the heat exchanger is a condenser of an air conditioning unit for the operator cab.

13. A working machine comprising:
a housing;
an engine disposed in the housing;
a working arm coupled to the housing and configured to be capable of performing working operations; and
a counterweight having a mass for counterbalancing the working arm, the counterweight being separate from the housing and comprising a mounting arrangement for the mounting of a heat exchanger thereon,
the counterweight comprising an inlet on a first external surface of the counterweight and an outlet on a second external surface of the counterweight that define an air flow path in the form of a duct through the counterweight to permit air to flow through the heat exchanger when mounted thereon, wherein the counterweight is formed as a single unitary component.

14. A working machine according to claim 1, further comprising an undercarriage, wherein the housing forms part of the undercarriage.

15. A working machine according to claim 1, further comprising a superstructure, wherein the housing forms part of the superstructure.

16. A working machine according to claim 1, wherein the heat exchanger is mounted to the duct, and the duct conforms to the shape of the heat exchanger.

17. A working machine comprising:
a housing;
an engine disposed in the housing;
a working arm coupled to the housing and configured to be capable of performing working operations; and
a counterweight having a mass for counterbalancing the working arm, the counterweight being separate from the housing and comprising a mounting arrangement for the mounting of a heat exchanger thereon,
the counterweight comprising an inlet on a first external surface of the counterweight and an outlet on a second external surface of the counterweight that define an air flow path in the form of a duct through the counterweight to permit air to flow through the heat exchanger when mounted thereon, wherein the heat exchanger is a condenser of an air conditioning system.

* * * * *